March 9, 1926.

J. TEIPEL ET AL

MOTOR HOUSING

Filed Oct. 26, 1922

INVENTORS
Joseph Teipel.
& W. F. Exner.
By Bakewell & Church
ATTORNEYS

March 9, 1926.
J. TEIPEL ET AL
1,575,660
MOTOR HOUSING
Filed Oct. 26, 1922
2 Sheets-Sheet 2
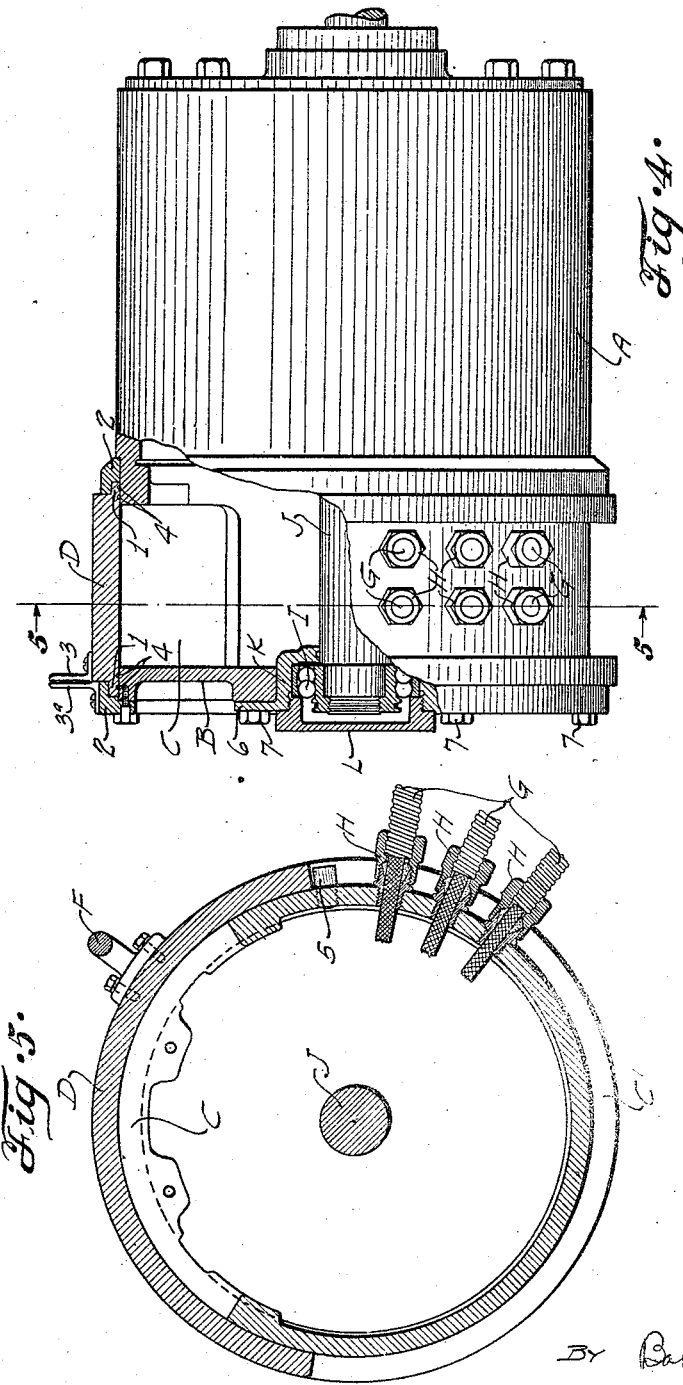
INVENTORS
Joseph Teipel.
& W. F. Exner.
BY Bakewell & Church
ATTORNEYS Patented Mar. 9, 1926.

1,575,660

UNITED STATES PATENT OFFICE.

JOSEPH TEIPEL AND WILLIAM F. EXNER, OF ST. LOUIS, MISSOURI, ASSIGNORS TO MANCHA STORAGE BATTERY LOCOMOTIVE COMPANY, OF ST. LOUIS, MISSOURI, A CORPORATION OF DELAWARE.

MOTOR HOUSING.

Application filed October 26, 1922. Serial No. 597,219.

*To all whom it may concern:*

Be it known that we, JOSEPH TEIPEL and WILLIAM F. EXNER, citizens of the United States, residing in the city of St. Louis, State of Missouri, have invented a certain new and useful Improvement in Motor Housings, of which the following is a full, clear, and exact description, such as will enable others skilled in the art to which it appertains to make and use the same.

This invention relates to housings for electric motors, and has for its main object to provide a motor housing of simple design and inexpensive construction that is particularly adapted for use on electric storage battery mine locomotives, due to the fact that it is constructed in such a way that it is practically impossible for a flame produced by an explosion inside of the housing to escape therefrom and ignite a gas leak in a mine.

Another object is to provide a motor housing having the desirable characteristic above referred to, that can be opened easily to provide access to the motor arranged inside of same. Other objects and desirable features of my invention will be hereinafter pointed out.

It its simplest form our improved motor housing consists of a casing having an opening in same that provides access to the motor arranged inside of the housing and a closure for said opening arranged in sliding engagement with the portion of the casing in which the opening is formed. The casing is preferably cylindrical in cross section and the closure for the opening in the casing preferably consists of an annular member or ring surrounding the casing and provided with an opening that is adapted to be brought into registration with the opening in the casing by turning or oscillating said annular member. The interior of the annular closure and the outer surface of the portion of the casing on which it slides are preferably machined, so as to produce a tight joint between said parts, and the casing is provided with annular guides that embrace the edge portions of said closure.

Figure 1 of the drawings is a diagrammatic view, illustrating our improved motor housing arranged in operative position on a storage battery mine locomotive.

Figure 4 is a side elevational view of the housing, partly broken away; and

Figure 5 is a transverse sectional view, taken on the line 5—5 of Figure 4, looking in the direction indicated by the arrows.

Figure 1:
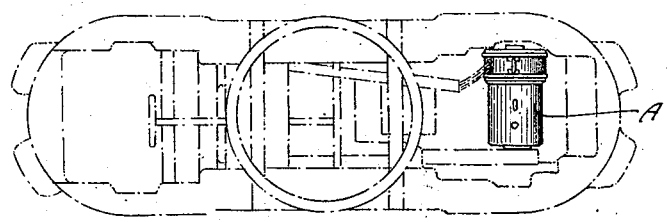
Figure 2:
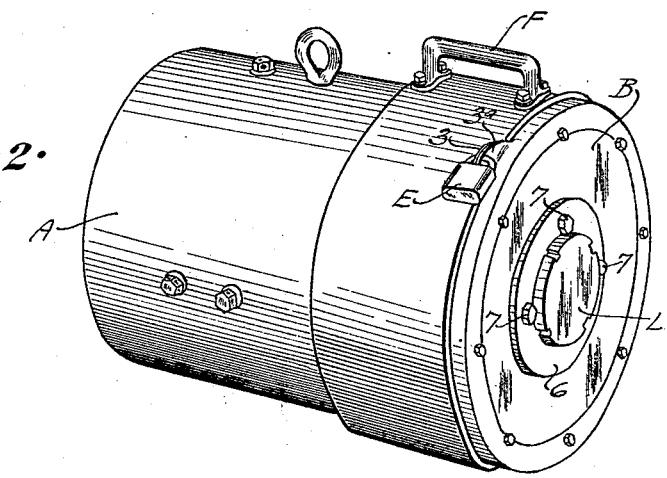
Figure 2 is a perspective view of the housing, illustrating the movable closure locked in its closed position.
Figure 3:
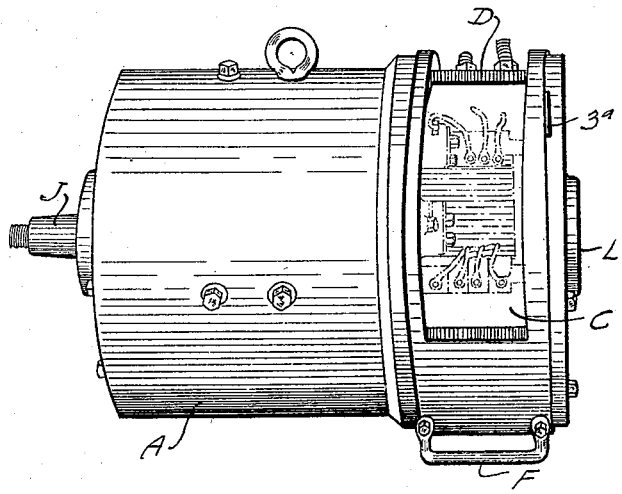
Figure 3 is a top plan view of the housing, showing the closure open.

Referring to the drawings which illustrate the preferred form of our invention, A designates a casing of cylindrical form in transverse section provided at one end with an integral end wall B and having a hole or opening C formed in same adjacent said end wall, as shown in Figure 4. A movable closure D is provided for normally closing the opening C, which closure is preferably formed by an annular member or ring that completely encircles and snugly engages the portion of the casing A in which the opening C is formed, it being preferable to form said casing A and closure D from castings whose co-operating surfaces are machined, so as to produce a tight joint between the closure and the casing. The closure D is provided with an opening C' and said closure is revolubly mounted or oscillatingly mounted on the casing A in such a way that it can be turned or oscillated so as to bring the opening C' in same into registration with the opening C in the casing A, and thus provide access to the motor arranged inside of the housing. In order to make the housing substantially gas and flame proof, we provide the closure D with laterally-projecting flanges 1 at its edges that are overlapped or embraced by stationary rings 2 on the housing that form guideways in which the closure D travels. Normally, the closure D is arranged in such a position that a solid portion of same extends over the opening C in the casing A, and if desired, said closure and one of the guides 2 can be provided with co-operating perforated ears 3 and 3ª in which the hasp of a padlock E can be inserted to lock the closure in its closed position. The closure D can also be provided with a handle F that can be grasped to turn or oscillate said closure into and out of its closed position. The lateral flanges 1 on the closure D and the guide rings 2 on the casing that embrace said flanges not only retain the closure D in operative relationship with the portion of the casing A which it surrounds and hold said closure in snug engagement with the casing; but they also operate to prevent a flame on the interior of the housing, produced by an internal explosion, from escaping from the casing A around the edges of the closure D. If desired, annular grooves 4 can be formed in the closure D at the points where the edge portions of said closure bear upon the exterior of the casing A, so as to produce expansion chambers that effectively cut off the escape of a flame from the interior of the housing.

The electric wires G that lead to the motor arranged inside of the housing extend through packing devices H on the casing A which are arranged in said casing in such a way that they are positioned in the opening C' in the closure D, and if desired, the casing A can be provided with a pin 5, as shown in Figure 5, that projects outwardly through the opening C' in the closure D and acts as a stop to arrest the movement of said closure when it is moved into position to bring a solid portion of same over the opening C in the casing A.

The integral end wall B of the casing A is provided with a supporting means for a friction reducing bearing I that sustains one end of the shaft J of the motor arranged inside of the housing. Preferably, said supporting means is formed by a substantially cup-shaped member K arranged in a hole in the end wall B and provided with a flange 6 that laps over the outside face of the end wall B and to which it is secured by fastening devices 7. In order to prevent gas from leaking into the casing around the bearing I or the flame from an internal explosion escaping from the casing through or around said bearing, we have provided the bearing supporting member K in the end wall B with a removable cap L that is screwed into the member K, as shown in Figure 4.

A motor housing of the construction above described is exceptionally strong and rugged, it can be opened easily to provide access to the motor inside of same, it is inexpensive to manufacture and it is substantially gas and flame proof, thereby making it particularly adapted for use on electric storage battery mine locomotives, due to the fact that an explosion can occur inside of the housing without danger of igniting a gas leak in a mine, due, of course, to the fact that the closure for the housing is constructed in such a way that a flame cannot escape from the interior of the housing past said closure.

Having thus described our invention, what we claim as new and desire to secure by Letters Patent is:

1. A motor housing consisting of a casing having a cylindrical wall provided with an opening, an annular closure for said opening surrounding said wall and provided with a co-operating opening, and guides on the exterior of said cylindrical wall that embrace reduced portions at the edges of said annular closure.

2. A motor housing consisting of a casing provided with a cylindrical portion that contains an opening, an annular closure for said opening surrounding said cylindrical portion and provided with a co-operating opening, guides on the exterior of the casing that bear against the edge portions of said annular closure, flanges on said closure embraced by said guides, and means that tend to prevent a flame from escaping from the interior of the casing through the joints between said guides and annular closure.

JOSEPH TEIPEL.
WILLIAM F. EXNER.